United States Patent
Yamanaka et al.

(10) Patent No.: US 8,082,746 B2
(45) Date of Patent: Dec. 27, 2011

(54) REFRIGERATION CYCLE DEVICE FOR VEHICLE

(75) Inventors: Takashi Yamanaka, Kariya (JP); Shin Nishida, Anjo (JP)

(73) Assignee: Denso Corporation, Kariya (JP)

( * ) Notice: Subject to any disclaimer, the term of this patent is extended or adjusted under 35 U.S.C. 154(b) by 545 days.

(21) Appl. No.: 12/378,994

(22) Filed: Feb. 20, 2009

(65) Prior Publication Data

US 2009/0211278 A1    Aug. 27, 2009

(30) Foreign Application Priority Data

Feb. 22, 2008   (JP) .................. 2008-041936

(51) Int. Cl.
- F25B 31/00   (2006.01)
- F25B 49/00   (2006.01)
- B60H 1/32   (2006.01)

(52) U.S. Cl. ............ 62/193; 62/217; 62/228.1; 62/470

(58) Field of Classification Search .......... 62/149, 62/193, 217, 228.1, 228.5, 470; 417/279

See application file for complete search history.

(56) References Cited

U.S. PATENT DOCUMENTS

| | | | |
|---|---|---|---|
| 5,531,080 A | 7/1996 | Hirahara et al. | |
| 5,660,051 A | 8/1997 | Sakakibara et al. | |
| 6,352,416 B1 | 3/2002 | Ota et al. | |
| 6,511,297 B2 * | 1/2003 | Ota et al. | 417/222.2 |
| 6,997,000 B2 | 2/2006 | Hirota | |
| 7,413,422 B2 | 8/2008 | Ito | |
| 2003/0159449 A1 | 8/2003 | Takano et al. | |
| 2004/0206098 A1 | 10/2004 | Takano et al. | |
| 2006/0026982 A1 | 2/2006 | Yamamoto et al. | |

FOREIGN PATENT DOCUMENTS

| | | |
|---|---|---|
| JP | 63-198788 | 8/1988 |
| JP | 07-208819 | 8/1995 |
| JP | 09-076741 | 3/1997 |
| JP | 9-104221 | 4/1997 |
| JP | 11-093880 | 4/1999 |
| JP | 2000-103227 | 4/2000 |

(Continued)

OTHER PUBLICATIONS

Office action dated Jun. 22, 2010 in corresponding Japanese application No. 2008-041936.

(Continued)

*Primary Examiner* — Marc Norman

(74) *Attorney, Agent, or Firm* — Harness, Dickey & Pierce, PLC

(57) ABSTRACT

In a refrigeration cycle device for a vehicle, a weak-inflammability refrigerant that does not ignite at a high-temperature heat source mounted in an engine compartment of the vehicle in a refrigerant single state is circulated in a refrigerant cycle. The refrigerant cycle includes a compressor for compressing and discharging the refrigerant. The compressor includes an oil separator that is located at a refrigerant discharge side of the compressor to separate a lubrication oil from the refrigerant and to return the separated lubrication oil to an interior of the compressor, a shutting portion configured to shut a reverse flow of the refrigerant at a refrigerant suction side of the compressor, and a driving portion located to drive the shutting portion. Furthermore, the driving portion causes the shutting portion to shut the reverse flow of the refrigerant when the refrigerant cycle is damaged.

19 Claims, 2 Drawing Sheets

FOREIGN PATENT DOCUMENTS

| | | |
|---|---|---|
| JP | 2000-265948 | 9/2000 |
| JP | 2001-317841 | 11/2001 |
| JP | 2003-322420 | 11/2003 |
| JP | 2004-183957 | 7/2004 |
| JP | 2004-251130 | 9/2004 |
| JP | 2005-001409 | 1/2005 |
| JP | 2005-153673 | 6/2005 |
| JP | 2005-219705 | 8/2005 |
| JP | 2005-299546 | 10/2005 |
| JP | 2006-044424 | 2/2006 |
| JP | 2006-051870 | 2/2006 |
| JP | 2006-151016 | 6/2006 |
| JP | 2006-162122 | 6/2006 |
| JP | 2006-316660 | 11/2006 |
| JP | 2007-056721 | 3/2007 |
| JP | 2007-510039 | 4/2007 |
| JP | 2007-191137 | 8/2007 |
| WO | WO 2005/042663 | 5/2005 |

OTHER PUBLICATIONS

Office action dated Jan. 19, 2010 in corresponding Japanese application No. 2008-041936.

* cited by examiner

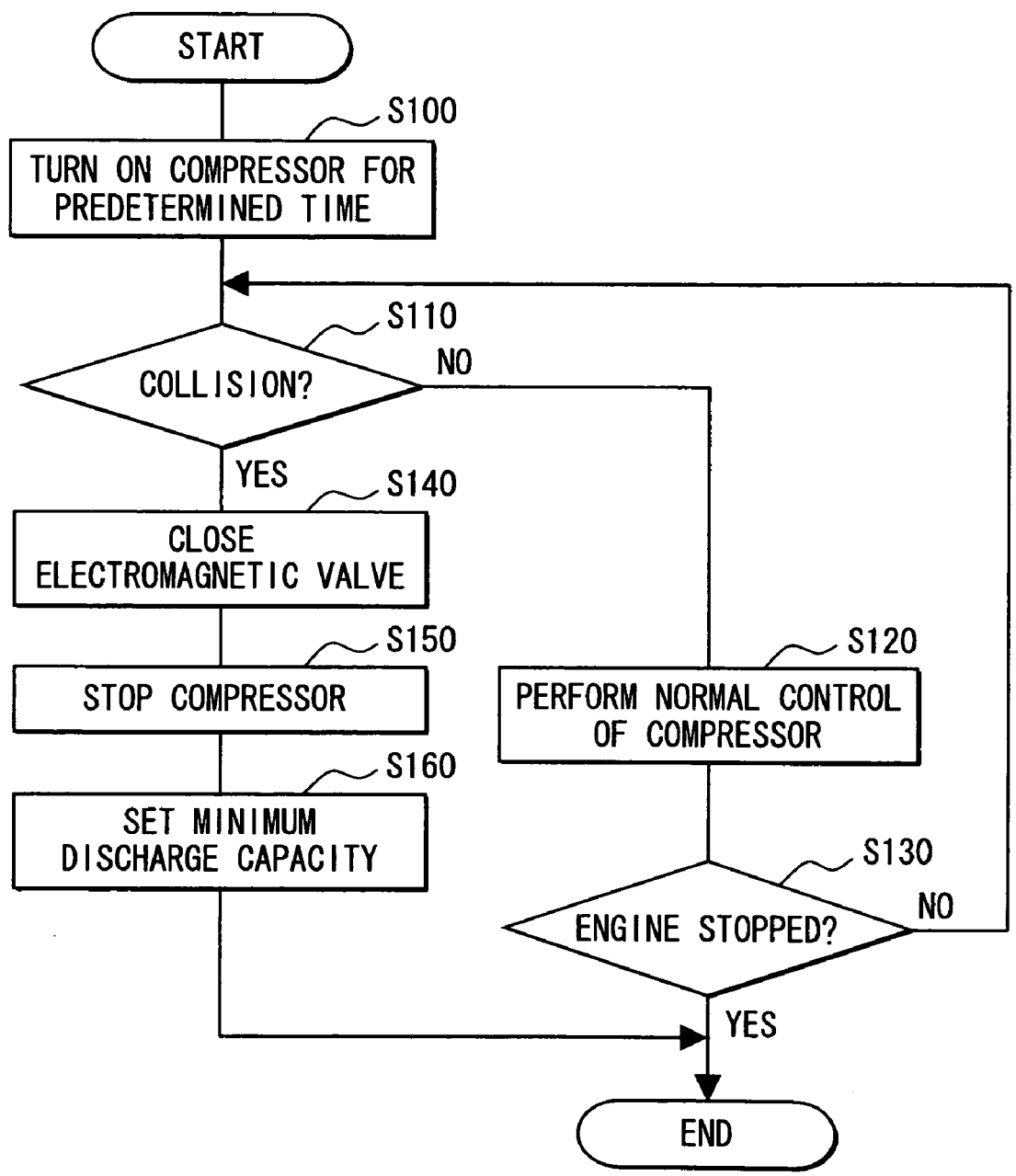

REFRIGERATION CYCLE DEVICE FOR VEHICLE

CROSS REFERENCE TO RELATED APPLICATION

This application is based on Japanese Patent Application No. 2008-041936 filed on Feb. 22, 2008, the contents of which are incorporated herein by reference in its entirety.

FIELD OF THE INVENTION

The present invention relates to a refrigeration cycle device for a vehicle, which uses a weak-inflammability refrigerant as a refrigerant in a refrigerant cycle.

BACKGROUND OF THE INVENTION

Conventionally, a refrigeration cycle device described in JP 2006-44424A (corresponding to US 2006/0026982 A1) is used for a vehicle air conditioner. In the vehicle air conditioner, an inflammable refrigerant is used in a refrigerant cycle, and an oil separation and recovery device is located adjacent to a refrigerant discharge port of a compressor. The oil separation and recovery device separates the refrigerant and a lubrication oil from each other, and the lubrication oil is returned to the compressor. In the refrigerant cycle with the oil separation and recovery device, it is possible to reduce an amount of the refrigerant in which the lubrication oil is mixed in the refrigerant cycle, thereby improving the safety when the refrigerant leaks from the refrigerant cycle.

However, in the vehicle air conditioner described in JP 2006-44424A, the refrigerant may directly leak from the compressor when the refrigerant cycle device is damaged by a vehicle collision or the like.

In another vehicle air conditioner with a refrigerant cycle described in JP 2005-1409A, a check valve or a switching valve or the like is provided between respective components of the refrigerant cycle. When a compressor of the refrigerant cycle is stopped, the circulation path of the refrigerant cycle is partitioned into plural areas by the check valves or the switching valves. Thus, it is possible to reduce a leakage amount of the refrigerant even when a refrigerant leakage is caused in the circulation path of the refrigerant cycle due to a vehicle collision or the like.

However, in the vehicle air conditioner described in JP 2005-1409A, the refrigerant including lubrication oil may leak from a damaged portion in the refrigerant cycle.

SUMMARY OF THE INVENTION

In view of the foregoing problems, it is an object of the present invention to provide a refrigeration cycle device for a vehicle, which can improve the safety while preventing a lubrication oil mixed in refrigerant from being leaked from a refrigerant cycle when the refrigerant cycle is damaged.

It is another object of the present invention to provide a refrigeration cycle device for a vehicle, which can prevent a lubrication oil mixed in refrigerant from being leaked from a refrigerant cycle at a low cost, when the refrigerant cycle is damaged.

According to an aspect of the present invention, a refrigeration cycle device for a vehicle, includes a refrigerant cycle in which a weak-inflammability refrigerant that does not ignite at a high-temperature heat source mounted in an engine compartment of the vehicle in a refrigerant single state is circulated, and a control device configured to control operation of the compressor. The refrigerant cycle includes at least a compressor configured to compress the refrigerant and to discharge the compressed refrigerant so as to cause the refrigerant to be circulated in the refrigerant cycle. The compressor includes an oil separator that is located at a refrigerant discharge side of the compressor to separate a lubrication oil mixed in the refrigerant and to return the separated lubrication oil to an interior of the compressor, a shutting portion configured to shut a reverse flow of the refrigerant at a refrigerant suction side of the compressor, and a driving portion located to drive the shutting portion. In addition, the driving portion causes the shutting portion to shut the reverse flow of the refrigerant when the refrigerant cycle is damaged.

Accordingly, it is possible for the refrigerant after being separated from the lubrication oil can be discharged from the refrigerant discharge side of the compressor and is circulated in the refrigerant cycle. Thus, even when the refrigerant cycle is damaged, it can prevent the refrigerant mixed with the lubrication oil from being leaked to the exterior of the refrigerant cycle because the separated lubrication oil is returned into the compressor. Furthermore, when the refrigerant cycle is damaged, a reverse flow of the refrigerant from the refrigerant suction side of the compressor can be shut by the shutting portion and the driving portion, thereby preventing the refrigerant mixed with the lubrication oil from being leaked.

For example, the shutting portion and the driving portion may be configured by a pressure-response type check valve. The compressor may further include a switching portion that is configured to open and close a downstream refrigerant passage of the oil separator in a refrigerant flow. The control device may be configured to close the downstream refrigerant passage of the oil separator at a vehicle collision. Furthermore, the control device may be configured to stop the compressor at a vehicle collision.

According to another aspect of the present invention, a refrigeration cycle device for a vehicle includes a refrigerant cycle in which a weak-inflammability refrigerant that does not ignite at a high-temperature heat source mounted in an engine compartment of the vehicle in a refrigerant single state is circulated. The refrigerant cycle includes at least a compressor configured to compress the refrigerant and to discharge the compressed refrigerant so as to cause the refrigerant to be circulated in the refrigerant cycle. Furthermore, the compressor includes a relieve valve that is configured to discharge the refrigerant on a high-pressure side in the compressor to an exterior of the compressor when a refrigerant pressure in the compressor on the high-pressure side becomes higher than a predetermined pressure, and an oil separating and catching portion located to separate the lubrication oil mixed in the refrigerant flowing out of the relieve valve and to catch the separated lubrication oil. Accordingly, even when the refrigerant mixed with the lubrication oil flows out from the relieve valve, a flow-out of the lubrication oil can be prevented by the oil separating and catching portion, thereby preventing the refrigerant mixed with the lubrication oil from being leaked.

In the above-described any aspects of the present invention, the refrigerant may be an olefin-based refrigerant. The compressor may be a fixed displacement compressor in which its discharge capacity is fixed when the compressor operates, or may be a variable displacement compressor in which its discharge capacity per one rotation is changeable between a minimum discharge capacity and a maximum discharge capacity. In the variable displacement compressor, the control device causes the compressor to set at the minimum discharge capacity at a vehicle collision.

In the above-described any aspects of the present invention, the compressor may be controlled to be forcibly operated for a predetermined time every when a vehicle start, regardless of whether existence or nonexistence of an operation request of the refrigerant cycle.

BRIEF DESCRIPTION OF THE DRAWINGS

Additional objects and advantages of the present invention will be more readily apparent from the following detailed description of preferred embodiments when taken together with the accompanying drawings. In which:

FIG. 3 is a flow diagram showing a control operation performed by a control device according to the embodiment.

DETAILED DESCRIPTION OF THE PREFERRED EMBODIMENTS

A refrigeration cycle device according to an embodiment of the present invention or modifications thereof will be described below with reference to FIGS. 1 to 3.

Figure 1:
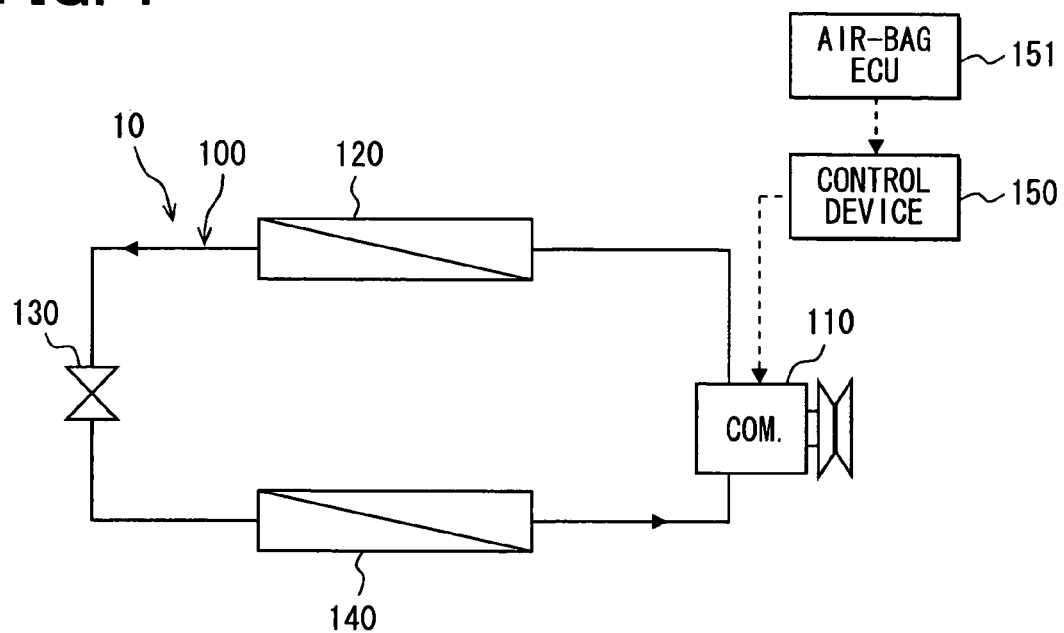
FIG. 1 is a schematic diagram showing a refrigeration cycle device according to an embodiment of the present invention.
Figure 2:
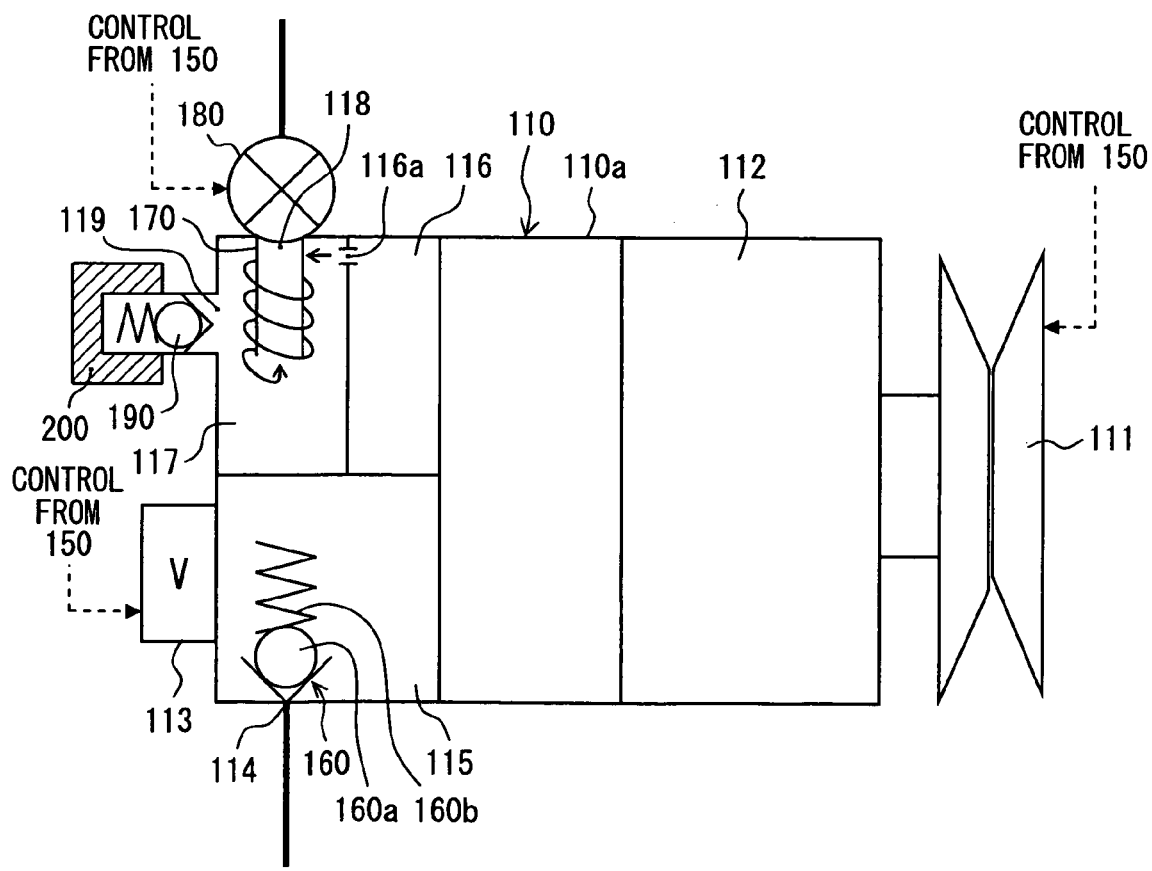
FIG. 2 is a schematic diagram showing a compressor structure according to the embodiment.

For example, a refrigeration cycle device 10 shown in FIG. 1 is mounted to a vehicle which is traveled by an engine as a driving source. The refrigeration cycle device 10 is used for a vehicle air conditioner for performing air conditioning in a passenger compartment of the vehicle. The refrigeration cycle device 10 includes a refrigerant cycle 100 through which refrigerant circulates, and a control device 150 for controlling components of the refrigerant cycle 100. In the present embodiment, a weak-inflammability refrigerant is used as the refrigerant circulating in the refrigerant cycle 100. The weak-inflammability refrigerant is any refrigerants that do not ignite at a high-temperature heat source mounted in an engine compartment of the vehicle, in a refrigerant single state. For example, the high-temperature heat source in the engine compartment is an exhaust manifold or the like, and the weak-inflammability refrigerant is an olefin-based refrigerant. In the refrigerant, a lubrication oil for smoothly performing the operation of slidable portions (e.g., bearings) in a compressor 110 is included in the refrigerant by a predetermined ratio.

The refrigerant cycle 100 includes the compressor 110, a condenser (gas cooler) 120, an expansion valve 130 and an evaporator 140 which are connected in this order to construct a closed cycle in which the refrigerant circulates. The evaporator 140 is located in an air conditioning case that is located in an instrument panel (dashboard) within the passenger compartment. A blower unit is also located in the instrument panel within the passenger compartment to blow air into the passenger compartment via an air passage defined in the air conditioning case. Therefore, the evaporator 140 can cool air passing therethrough in the air conditioning case, thereby performing air conditioning operation of the passenger compartment. The compressor 110, the condenser 120 and the expansion valve 130 are located in the engine compartment that is partitioned from the passenger compartment in the vehicle.

The compressor 110 is a fluid machine configured to compress the refrigerant to a high-pressure and high-temperature refrigerant, and to discharge the compressed refrigerant toward the condenser 120. The condenser 120 is generally located at a front side in the engine compartment to perform heat exchange between the refrigerant discharged from the compressor 110 and outside air flowing into the engine compartment of the vehicle. That is, the condenser 120 is a heat exchanger configured to cool the refrigerant discharged from the compressor 110 by performing heat exchange with the outside air. For example, the condenser 120 is located at a rear side of a grill of the vehicle.

The expansion valve 130 is a decompression unit that is configured to decompress the refrigerant flowing out of the condenser 120 so that the decompressed refrigerant has a low pressure and low temperature. In the present embodiment, the expansion valve 130 is a thermal expansion valve in which its valve open degree is adjusted in accordance with a temperature of the refrigerant flowing out of the evaporator 140.

The evaporator 140 is located in the air conditioning case to cross all passage area in the air conditioning case so as to cool air passing through the air conditioning case. Therefore, the evaporator 140 is a heat exchanger configured to cool air passing therethrough by performing heat exchange between air to be blown into the passenger compartment and the refrigerant decompressed by the expansion valve 130.

Next, the structure of the compressor 110 will be described with reference to FIG. 2. The compressor 110 has a pulley 111 that is connected to a crank pulley of an engine by using a belt or the like, so that the compressor 110 is driven by the engine. An electromagnetic clutch (not shown) is located in the pulley 111 to interrupt a drive force from the engine to the compressor 110. The interruption and connection of the electromagnetic clutch is controlled by the control device 150. For example, when the electromagnetic clutch is connected, the compressor 110 is operated by the driving force of the engine. In contrast, when the electromagnetic clutch is disconnected (shut down), the operation of the compressor 110 is stopped.

In the present embodiment, the compressor 110 is a variable displacement compressor configured to adjust the discharge capacity per one rotation. For example, a swash-plate type compressor is used as the compressor 110. Here, the discharge amount of the refrigerant discharged from the compressor 110 is a value obtained by multiplying the discharge capacity per one rotation and the rotation speed of the compressor 110.

The swash plate of the compressor 110 is located in a swash plate chamber 112 to be rotated together with a rotation shaft of the compressor 110, and a piston slidable in the cylinder is connected to the swash plate. A pressure control valve 113 is located in the compressor 110, and is configured such that the pressure in the swash plate chamber 112 is adjusted by adjusting a valve open degree of the pressure control valve 113. That is, the valve open degree of the pressure control valve 113 is controlled by the control device 150 so that a middle pressure between a discharge pressure and a suction pressure in the compressor 110 can be adjusted, thereby changing a tilt angle of the swash plate relative to the rotation shaft of the compressor 110. In the present embodiment, it is possible to continuously adjust the discharge capacity per rotation of the compressor 110, from a minimum discharge capacity (approximately zero) to a maximum discharge capacity.

The valve open degree of the pressure control valve 113 is adjusted by a control signal (e.g., control current) output from the control device 150. Therefore, the discharge capacity and the discharge amount of the refrigerant of the compressor 110 can be controlled by the control device 150. For example, as the control signal applied from the control device 150 to the pressure control valve 113 is larger, the discharge capacity of the compressor 110 is changed to become larger.

A check valve 160 is provided at a refrigerant suction side of the compressor 110, as a component of the compressor 110. The check valve 160 is provided in a suction chamber 115, and is configured to shut a reverse flow of the refrigerant from the suction chamber 115 to the exterior of the compressor 110. In the general operation of the compressor 110, the refrigerant from the evaporator 140 is drawn into the suction chamber 115 of the compressor 110 through a suction port 114 of the compressor 110. The check valve 160 is a pressure-responding type check valve, and includes a valve body 160a and an elastic member 160b. The valve body 160a is formed into a boll shape, and is configured to open and close the suction port 114. The valve body 160 is an example of a shutting portion. The elastic member is configured to apply a spring force to the valve body 160a in a direction closing the suction port 114. The elastic member 160b is an example of a driving portion for applying a predetermined force to the valve body 160a in the direction closing the suction port 114. In the present embodiment, a spring member is used as the elastic member 160b.

When the compressor 110 is normally operated, a difference between the refrigerant pressure on a side of the evaporator 140 and the refrigerant pressure on a side of the suction chamber 115 of the compressor 110 is larger than the spring force of the elastic member 160b, so that the valve body 160a is moved in a direction leaving from the suction port 114. In this case, the check valve 160 opens the suction port 114 so that the refrigerant is drawn into the suction chamber 115 via the suction port 114. By contrast, when the compressor 110 is stopped, the valve body 160a is moved by the spring force of the elastic member 160 and the difference between the refrigerant pressure on the side of the evaporator 140 and the refrigerant pressure on the side of the suction chamber 115, so as to contact the suction port 114. In this case, the check valve 160 closes the suction port 114 to interrupt a reverse flow of the refrigerant from the compressor 110.

An oil separator 170 is provided in a high-pressure chamber 117 of the compressor 110. In the compressor 110, a discharge chamber 116 of the compressor 110 is connected to the high-pressure chamber 117 via a flow hole 116a having a small diameter. The oil separator 170 is configured to separate the lubrication oil from the refrigerant and to send the separated lubrication oil to respective sliding portions of the compressor 110. The oil separator 170 is a centrifugal type separator having a cylindrical member elongated downwardly from the flow hole 116a. One end portion (e.g., upper end portion of FIG. 2) of the cylindrical member of the oil separator 170 is provided to communicate with a discharge port 118 of the compressor 110.

The refrigerant passing through the flow hole 116a from the discharge chamber 116 flows downwardly while being swirled by the oil separator 170, so that the lubrication oil having a relatively large specific density included in the refrigerant is separated to move toward a side wall. The separated lubrication oil is stored on a lower side in the high-pressure chamber 117, while the separated refrigerant flows out of the discharge port 118 of the compressor 110. The lubrication oil separated in the high-pressure chamber 117 is supplied to respective sliding portions of the compressor 110.

An electromagnetic valve 180 is located at a downstream side of the oil separator 170 in a refrigerant flow to open and close a downstream side passage of the oil separator 170 in the refrigerant flow. For example, the electromagnetic valve 180 is configured to directly open and close the discharge port 118. The electromagnetic valve 180 is formed integrally with the housing 110a of the compressor 110, and the operation of the electromagnetic valve 118 is controlled by the control device 150.

A relief opening portion 119 and a relief valve 190 are provided in the compressor 110. The relief opening portion 119 is configured such that the high-pressure chamber 117 of the compressor 110 communicates with an exterior of the compressor 110 through the relief opening portion 119, other than the refrigerant cycle 110. The relief valve 190 is configured to open the relief opening portion 119 when the refrigerant pressure on the high-pressure side (e.g., discharge chamber 116, high-pressure chamber 117) of the compressor 110 becomes larger than a predetermined pressure due to some reasons, so that the refrigerant in the high-pressure chamber 117 flows out to the exterior via the relief opening portion 119 and the inner pressure of the compressor 110 is discharged to the exterior of the compressor 110.

A cap 200 is attached to a refrigerant downstream side of the relief valve 190 so as to separate the lubrication oil and to trap the separated lubrication oil therein. For example, the cap 200 is an oil filter made of a porous material in which the refrigerant can pass therethrough but the separated oil is stored on the surface of the cap 200 without passing therethrough.

The control device 150 is constructed with a microcomputer and circumference circuits. The control device 150 is configured to be operatively linked with an air-bag controller 151 (air-bag ECU). The control device 150 receives various signals, and performs predetermined calculations and determinations based on the received various signals, thereby controlling the operation and the discharge amount, etc. of the compressor 110. For example, the various signals to be sent to the control device 150 includes an engine rotational speed signal from an engine rotational speed sensor, a vehicle collision signal from the air-bag controller 151, an air conditioning request signal or a set temperature signal set by a passenger by using operation members or the like provided on an operation panel (not shown), an outside air temperature signal from an outside air temperature sensor (not shown), an inside air temperature signal from an inside air temperature sensor (not shown), a solar radiation signal from a solar radiation sensor (not shown), a cooled air temperature signal from a thermistor located to detect an air temperature cooled by the evaporator 140, or the like. The control device 150 performs predetermined calculations and determinations or the like based on control programs (e.g., flow diagram shown in FIG. 3), so as to control the operation of the electromagnetic clutch of the pulley 111 of the compressor 110, the valve open degree of the pressure control valve 113 and the opening and closing of the electromagnetic valve 180.

Next, control operation of the refrigeration cycle device 10 will be described with reference to the flow diagram shown in FIG. 3.

The control device 150 starts the control proceeding shown in FIG. 3, when a user rides the vehicle and turns on an ignition switch so as to start operation of the engine. First, at step S100, the electromagnetic valve 180 opens the discharge port 118 and the compressor 110 is operated for a predetermined time (e.g., 30 seconds-60 seconds) regardless of whether existence or nonexistence of an air conditioning request signal. That is, every when the ignition switch is turned on, the compressor 110 is operated for the predetermined time using the engine drive force by connecting the electromagnetic clutch of the pulley 111. At this time, the valve open degree of the pressure control valve 113 is adjusted so that the discharge capacity of the compressor 110 becomes a predetermined capacity.

Next, the control device 150 is set to always monitor existence or nonexistence of a vehicle collision signal from the air-bag controller 151. When a vehicle collision signal from the air-bag controller 151 is not received by the control device 150 at step S110, that is, when there is no a vehicle collision, the control device 150 causes the compressor 110 to perform a normal control at step S120.

That is, at step S120, when the control device 150 receives an air conditioning request signal, the control device 150 calculates a target temperature (TAO) of air to be cooled based on a set temperature signal, an outside air temperature signal, an inside air temperature signal and a solar radiation signal. Then, the operation of the compressor 110 is controlled so that the air temperature cooled by the evaporator 140 is approached to the calculated target temperature (TAO). Generally, the interruption operation of the electromagnetic clutch of the pulley 111 is controlled and the valve open degree of the pressure control valve 113 are controlled so that the discharge capacity of the compressor 110 is controlled and the discharge amount of the refrigerant discharged from the compressor 110 is also adjusted.

Then, at step S130, it is determined whether the engine is stopped, that is, it is determined whether the engine rotational speed is zero. When the engine is operated, the control process is returned to step S110, and the compressor normal control at step S120 is continued while the vehicle collision signal is not received by the control device 150. That is, in a case where the engine is operated, the normal control of the compressor 110 is performed by the control device 150 while a vehicle collision signal is not received by the control device 150. When it is determined that the ignition switch is turned off by the user, e.g., when the engine is stopped at step S130, the control proceeding is ended.

In contrast, when the control device 150 receives a vehicle collision signal from the air bag controller 151, that is, when it is determined that a vehicle collision is caused at step S110, the control device 150 causes the electromagnetic valve 180 to forcibly close the discharge port 118 at step S140, and causes the compressor 110 to be forcibly stopped at step S150. That is, at step S150, the electromagnetic clutch of the pulley 111 of the compressor 110 is turned off so as to stop the operation of the compressor 110. Then, at step S160, the valve open degree of the pressure control valve 113 is adjusted so that the discharge capacity of the compressor 110 is changed to a minimum value (e.g., approximately zero).

According to the embodiment of the present invention, a weak-inflammability refrigerant such as an olefin-based refrigerant, including a lubrication oil, is used for the refrigerant cycle 100, and the compressor 110 is provided with the check valve 160 and the oil separator 170. Thus, the refrigerant separated from the lubrication oil by the oil separator 170 flows out of the discharge side of the compressor 110, and is circulated in the refrigerant cycle 100. Accordingly, even when the refrigerant cycle 100 is damaged by the vehicle collision or the other reasons, it can prevent a leakage of the lubrication oil together with the refrigerant from the refrigerant cycle 110. Furthermore, when the refrigerant cycle 100 is damaged, a reverse flow of the refrigerant from the suction side of the compressor 110 can be prevented by the check valve 160, thereby preventing a leakage of the lubrication oil together with the refrigerant from the compressor 110. As a result, the refrigeration cycle device 10 can accurately prevent a mixture of the refrigerant and the lubrication oil from being leaked to the exterior of the compressor 110.

Because the check valve 160 and the oil separator 170 are provided in the compressor 110, the oil leakage can be easily prevented in the compressor 110 with a low cost.

The electromagnetic valve 180 may be provided in the compressor 110. In this case, at a vehicle collision, it is possible to close the electromagnetic valve 180, to stop the compressor 110 and to set the discharge capacity of the compressor 110 at the minimum value.

Because the discharge capacity of the compressor 110 is changed to the minimum value, the refrigerant amount flowing out of the compressor 110 can be made minimum. At the same time, because the electromagnetic valve 180 is closed to shut the discharge port 118 and the compressor 110 is stopped, it can limit the refrigerant itself from flowing out from the discharge side of the compressor 110 at a vehicle collision.

In the present embodiment, the cap 200 is located at the refrigerant downstream side of the relief valve 190. Thus, even when the refrigerant mixed with the lubrication oil flows out of the relief valve 190, the cap 200 can prevent the lubrication oil from flowing out of the compressor 110 through the cap 200. For example, even in a case where the pressure of high-pressure side refrigerant is excessively increased due to insufficient of heat radiation in the condenser 120 or some other reasons, the cap 200 can prevent a leakage of the lubrication oil mixed in the refrigerant because only the refrigerant itself flows through the cap 200.

In the present embodiment, at a vehicle engine start time at step S100, the compressor 110 is forcibly operated for the predetermined time regardless of the air-conditioning request signal. Thus, when the lubrication oil stays in the refrigerant cycle 100 at places other than the compressor 110, the lubrication oil can be drawn into the compressor 110 together with the refrigerant, and thereby it is also possible to separate the lubrication oil at the oil separator 170. As a result, the refrigerant with a reduced amount of the lubrication oil can be circulated in the refrigerant cycle 100 other than the compressor 110.

OTHER EMBODIMENTS

Although the present invention has been fully described in connection with the preferred embodiments thereof with reference to the accompanying drawings, it is to be noted that various changes and modifications will become apparent to those skilled in the art.

For example, in the above-described embodiment, the electromagnetic valve 180, the relief valve 190 and the cap 200 may be omitted in accordance with structure of the compressor. Even in this case, because the refrigerant after being separated from the lubrication oil by the oil separator 170 flows out of the discharge port 118 of the compressor 110 and is circulated in the refrigerant cycle 100, it can prevent a leakage of the lubrication oil together with the refrigerant from the refrigerant cycle 100 even when the refrigerant cycle 100 is damaged by the vehicle collision or the other reasons. Furthermore, in the flow diagram shown in FIG. 3, the step S100 may be omitted.

In the above-described embodiment, the variable displacement compressor 110 is a swash type compressor which is capable of varying the stroke of the piston. However, as the variable displacement compressor 110, the other type compressors may be used. For example, a suction-refrigerant bypass type compressor, a cylinder-number variable type compressor, or the like may be used. Furthermore, in the above-described embodiment, at step S150, the compressor 110 is stopped by using the electromagnetic clutch. However, instead of the electromagnetic clutch, an electrical motor may be used. In this case, the compressor 110 is driven by the electrical motor, and is controlled by controlling current applied to the electrical motor.

Alternatively, a fixed displacement compressor may be used instead of the variable displacement compressor. In this case, the step S160 is omitted.

The structure of the oil separator 170 may be suitably changed without being limited to the centrifugal type structure. For example, an oil filter configured to separate the lubrication oil from the refrigerant may be used instead of the centrifugal structure of the oil separator 170.

In the above-described embodiment, at least one of the check valve 160, the oil separator 170 and the electromagnetic valve 180 may be omitted in a compressor 110 that is provided with the relieve valve 190 and the cap 200. Even when all the check valve 160, the oil separator 170 and the electromagnetic valve 180 are not provided in the compressor 110, because the relieve valve 190 and the cap 200 are provided in the compressor 200, it can prevent the lubrication oil from being leaked to the exterior together with the refrigerant.

Such changes and modifications are to be understood as being within the scope of the present invention as defined by the appended claims.

What is claimed is:

1. A refrigeration cycle device for a vehicle, comprising:
a refrigerant cycle in which a weak-inflammability refrigerant that does not ignite at a high-temperature heat source mounted in an engine compartment of the vehicle in a refrigerant single state is circulated, the refrigerant cycle including at least a compressor configured to compress the refrigerant and to discharge the compressed refrigerant so as to cause the refrigerant to be circulated in the refrigerant cycle; and
a control device configured to control operation of the compressor, wherein
the compressor comprises
an oil separator that is located at a refrigerant discharge side of the compressor to separate a lubrication oil mixed in the refrigerant and to return the separated lubrication oil to an interior of the compressor,
a shutting portion configured to shut a reverse flow of the refrigerant at a refrigerant suction side of the compressor, and
a driving portion located to drive the shutting portion, the driving portion being configured to cause the shutting portion to shut the reverse flow of the refrigerant when the refrigerant cycle is damaged so that the refrigerant in the refrigerant cycle is leaked to an exterior of the refrigerant cycle, wherein
the compressor is a variable displacement compressor in which a discharge capacity per one rotation is changeable between a minimum discharge capacity and a maximum discharge capacity, and
the control device causes the compressor to set at the minimum discharge capacity in a vehicle collision.

2. The refrigeration cycle device according to claim 1, wherein the shutting portion and the driving portion are configured by a pressure-response type check valve.

3. The refrigeration cycle device according to claim 1, wherein the refrigerant is an olefin-based refrigerant.

4. The refrigeration cycle device according to claim 1, wherein the compressor further comprises a switching portion that is configured to open and close a downstream refrigerant passage of the oil separator in a refrigerant flow.

5. The refrigeration cycle device according to claim 4, wherein the control device causes the switching portion to close the downstream refrigerant passage of the oil separator at a vehicle collision.

6. The refrigeration cycle device according to claim 1, wherein the control device is configured to stop the compressor at a vehicle collision.

7. The refrigeration cycle device according to claim 1, wherein the compressor has therein a high-pressure chamber having a refrigerant discharge port from which the refrigerant is discharged, and
the oil separator is located in the high-pressure chamber such that the refrigerant separated from the lubrication oil is discharged from the discharge port.

8. A refrigeration cycle device for a vehicle, comprising:
a refrigerant cycle in which a weak-inflammability refrigerant that does not ignite at a high-temperature heat source mounted in an engine compartment of the vehicle in a refrigerant single state is circulated, the refrigerant cycle including at least a compressor configured to compress the refrigerant and to discharge the compressed refrigerant so as to cause the refrigerant to be circulated in the refrigerant cycle; and
a control device configured to control operation of the compressor, wherein
the compressor comprises
an oil separator that is located at a refrigerant discharge side of the compressor to separate a lubrication oil mixed in the refrigerant and to return the separated lubrication oil to an interior of the compressor,
a shutting portion configured to shut a reverse flow of the refrigerant at a refrigerant suction side of the compressor, and
a driving portion located to drive the shutting portion, the driving portion being configured to cause the shutting portion to shut the reverse flow of the refrigerant when the refrigerant cycle is damaged so that the refrigerant in the refrigerant cycle is leaked to an exterior of the refrigerant cycle,
wherein the control device causes the compressor to be operated for a predetermined time every when a vehicle starts, regardless of whether existence or nonexistence of an operation request of the refrigerant cycle.

9. The refrigeration cycle device according to claim 8, wherein the shutting portion and the driving portion are configured by a pressure-response type check valve.

10. The refrigeration cycle device according to claim 8, wherein the refrigerant is an olefin-based refrigerant.

11. The refrigeration cycle device according to claim 8, wherein the compressor further comprises a switching portion that is configured to open and close a downstream refrigerant passage of the oil separator in a refrigerant flow.

12. The refrigeration cycle device according to claim 11, wherein the control device causes the switching portion to close the downstream refrigerant passage of the oil separator at a vehicle collision.

13. The refrigeration cycle device according to claim 8, wherein the control device is configured to stop the compressor at a vehicle collision.

14. A refrigeration cycle device for a vehicle, comprising:
a refrigerant cycle in which a weak-inflammability refrigerant that does not ignite at a high-temperature heat source mounted in an engine compartment of the vehicle in a refrigerant single state is circulated, the refrigerant cycle including at least a compressor configured to compress the refrigerant and to discharge the compressed refrigerant so as to cause the refrigerant to be circulated in the refrigerant cycle; and
a control device configured to control operation of the compressor, wherein
the compressor comprises
an oil separator that is located at a refrigerant discharge side of the compressor to separate a lubrication oil mixed in the refrigerant and to return the separated lubrication oil to an interior of the compressor, a shutting portion configured to shut a reverse flow of the refrigerant at a refrigerant suction side of the compressor, and a driving portion located to drive the shutting portion, the driving portion being configured to cause the shutting portion to shut the reverse flow of the refrigerant when the refrigerant cycle is damaged so that the refrigerant in the refrigerant cycle is leaked to an exterior of the refrigerant cycle, wherein the compressor further includes a relieve valve that is configured to discharge the refrigerant on a high-pressure side in the compressor to an exterior of the compressor when a refrigerant pressure on the high-pressure side in the compressor becomes higher than a predetermined pressure, the relieve valve is provided with an oil separating and catching portion located to pass the refrigerant therethrough, to separate the lubrication oil mixed in the refrigerant, and to catch the separated lubrication oil on a surface, and the oil separating and catching portion is an oil filter made of a porous material.

15. The refrigeration cycle device according to claim 14, wherein the shutting portion and the driving portion are configured by a pressure-response type check valve.

16. The refrigeration cycle device according to claim 14, wherein the refrigerant is an olefin-based refrigerant.

17. The refrigeration cycle device according to claim 14, wherein the compressor further comprises a switching portion that is configured to open and close a downstream refrigerant passage of the oil separator in a refrigerant flow.

18. The refrigeration cycle device according to claim 17, wherein the control device causes the switching portion to close the downstream refrigerant passage of the oil separator at a vehicle collision.

19. The refrigeration cycle device according to claim 14, wherein the control device is configured to stop the compressor at a vehicle collision.

* * * * *